United States Patent [19]

Winiarz

[11] 3,827,702

[45] Aug. 6, 1974

[54] UNIDIRECTIONAL DIAPHRAGM FACE SEAL

[75] Inventor: Olgierd S. Winiarz, Granada Hills, Calif.

[73] Assignee: The Garrett Corporation, Los Angeles, Calif.

[22] Filed: Feb. 18, 1972

[21] Appl. No.: 227,358

[52] U.S. Cl. ............................................. 277/88
[51] Int. Cl. ................................................ F16j 15/36
[58] Field of Search ............... 277/81, 85, 88, 95, 27

[56] References Cited
UNITED STATES PATENTS
| | | | |
|---|---|---|---|
| 2,419,385 | 4/1947 | Beier | 277/85 |
| 2,608,425 | 8/1952 | Krug | 277/95 |
| 2,917,330 | 12/1959 | Vanta | 277/9 |
| 3,114,559 | 12/1963 | Miglietti et al. | 277/95 |

Primary Examiner—Louis R. Prince
Assistant Examiner—Robert J. Smith
Attorney, Agent, or Firm—Albert J. Miller

[57] ABSTRACT

A flexible diaphragm mounted seal operative in response to the differential pressure across the diaphragm.

1 Claim, 3 Drawing Figures

PATENTED AUG 6 1974 3,827,702

UNIDIRECTIONAL DIAPHRAGM FACE SEAL

BACKGROUND OF THE INVENTION

Conventional face seals normally achieve sealing by the initial preloading of a seal element against the rotating part. The seal element is loaded against the rotating part by some type of resilient element such as a spring or elastic material and remains in contact with the rotating element. This continuous contact between the seal element and the rotating element causes seal wear and, in most cases, requires a secondary seal, such as an O-ring to be used in conjunction with the seal element. In addition, a certain amount of power is being dissipated as a result of this continuous rubbing of the sealing faces.

SUMMARY OF THE INVENTION

A seal or sealing element is mounted upon a flexible diaphragm which deflects as a function of the pressures on either side of the diaphragm. Sealing between the seal element and the rotating element is accomplished only under pressure conditions during which leakage from one side of the seal to the other is to be prevented. When leakage does not have to be prevented, the seal element does not remain in contact with the rotating element.

DESCRIPTION OF THE PREFERRED EMBODIMENTS

Figure 1:
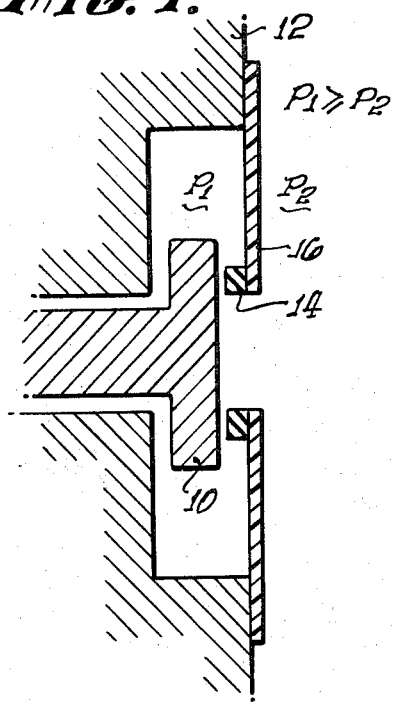
FIG. 1 is a schematic diagram of the diaphragm face seal of the present invention in its non-sealing position.
Figure 2:
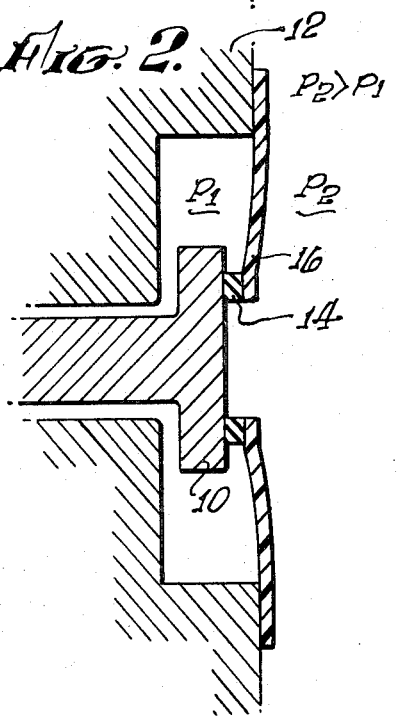
FIG. 2 is a schematic diagram of the diaphragm face seal of the present invention in its sealing position.

As schematically shown in FIGS. 1 and 2, the diaphragm face seal of the present invention can be illustrated in conjunction with a shaft 10 rotatably mounted within a stationary housing or casing 12. The seal element 14, of a material such as carbon, Teflon, or other solid lubricant material, is mounted in juxtaposition to the rotating shaft 10 by a flexible diaphragm 16 mounted upon the stationary casing 12. The flexibility of the diaphragm can be controlled by selection from materials such as copper or steel sheet or cloth fabric and by varying the thickness thereof and the position of attachment to the casing.

In normal operation as illustrated in FIG. 1, the pressure to the left of the diaphragm ($P_1$) will be equal to or greater than the pressure to the right of the diaphragm ($P_2$), such that there will be a clearance between the rotating shaft 10 and the sealing element 14. In this condition, leakage from left to right around the rotating shaft 10 can be tolerated and does not represent a problem. Since $P_1$ is greater than or equal to $P_2$ any leakage around the rotating shaft would be from left to right.

Leakage, however, from right to left would be highly undesirable, but the only time such leakage would tend to occur would be when the pressure $P_2$ became greater than the pressure $P_1$. If, however, $P_2$ does become greater than $P_1$ during some transient condition, the diaphragm 16 will deflect as shown in FIG. 2 to force the seal element 14 against the rotating shaft 10. The seal element 14 will continue to contact the shaft 10 as long as $P_2$ remains greater than $P_1$.

In this manner leakage can be prevented in the direction which would be detrimental to efficient operation without causing seal wear or power consumption during the normal operation of the rotating assembly. In other words, the seal will be engaged only when leakage across the seal would tend to be in the direction adverse to rotating machinery performance.

Figure 3:
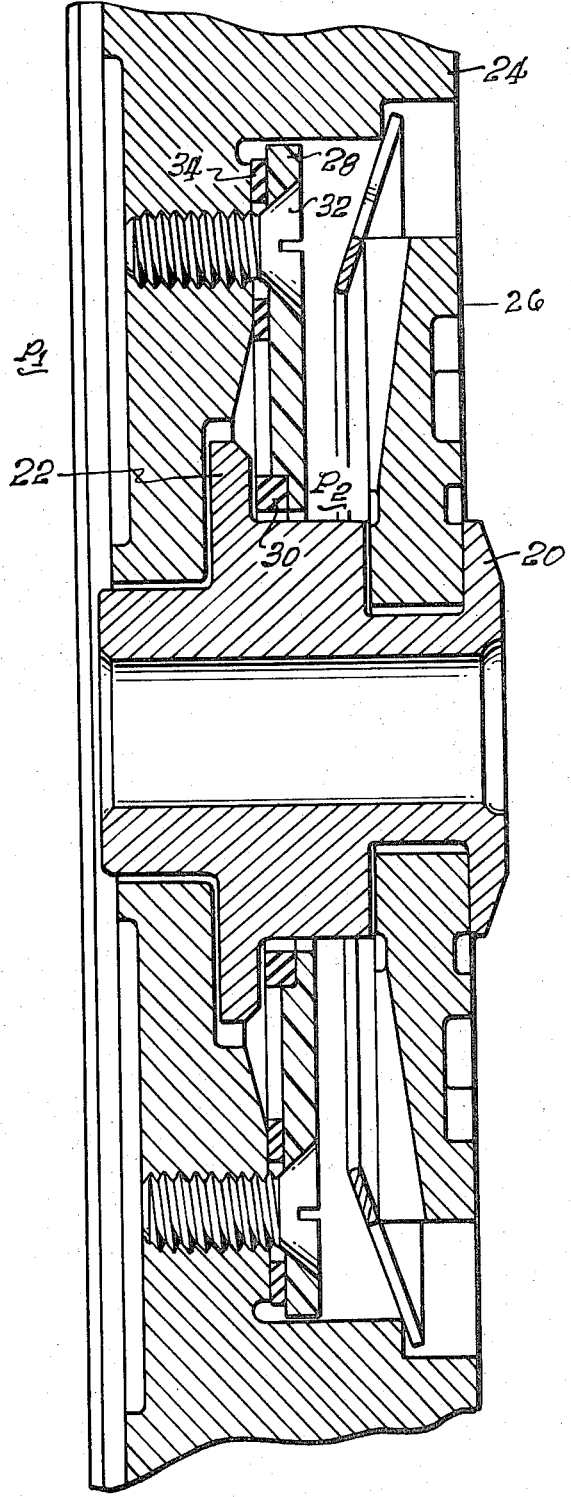
FIG. 3 is a sectional view of a rotating assembly incorporating the diaphragm face seal of the present invention.

A rotating assembly which utilizes the unidirectional diaphragm face seal is more clearly illustrated in FIG. 3. The rotating shaft assembly 20, having an outwardly extending central flange 22, is rotatably supported in a stationary casing 24 while being axially restrained by stationary thrust bearing 26. A flexible diaphragm 28 having seal element 30 is mounted to the stationary casing 24 by means of a plurality of screws 32. A gasket 34 would normally be provided between the stationary casing 24 and the diaphragm 28. Operation of the diaphragm face seal would be essentially as described with respect to FIGS. 1 and 2.

By keeping the seal from contacting or rubbing the rotating element or shaft during normal operation, seal wear can be minimized. In addition, there would no longer be any requirement for a secondary O-ring seal and power consumption would be decreased. The seal would only be operative during transient conditions when the pressures on either side of the diaphragm deviate from their normal values.

While specific embodiments of the invention have been illustrated and described, it is to be understood that these embodiments are provided by way of example only and that the invention is not to be construed as being limited thereto, but only by the proper scope of the following claims.

What I claim is:

1. A unidirectional diaphragm face seal comprising:

a stationary housing having a shaft receiving opening and a substantially circular enlarged recess at one end of said shaft receiving opening;

a rotating shaft rotatably supported in the shaft receiving opening of said stationary housing, said shaft having an outwardly extending flange disposed at the enlarged recess end of said rotating shaft;

axial shaft restraining means disposed around said shaft within the enlarged recess of said stationary housing;

a substantially disc-shaped flexible diaphragm mounted within the substantially circular enlarged recess of said stationary housing and having a central opening through which said rotating shaft extends, said flexible diaphragm subject to a fluid pressure $P_1$ on the outwardly extending flange side of said flexible diaphragm and subject to a fluid pressure $P_2$ on the opposite side thereof; and a seal element mounted on said flexible diaphragm, said seal element disposed around the central opening of said flexible diaphragm to sealingly engage the outwardly extending flange on said rotating shaft whenever fluid pressure $P_1$ is less than fluid pressure $P_2$ but to provide clearance therebetween whenever fluid pressure $P_1$ is at least equal to fluid pressure $P_2$.

* * * * *